United States Patent

Rosenberger et al.

[11] 4,246,198
[45] Jan. 20, 1981

[54] HINDERED PHENOLIC AMIDES

[75] Inventors: Siegfried Rosenberger, Riehen; Andreas Schmidt, Reinach, both of Switzerland

[73] Assignee: Ciba-Geigy Corporation, Ardsley, N.Y.

[21] Appl. No.: 37,854

[22] Filed: May 10, 1979

Related U.S. Application Data

[63] Continuation of Ser. No. 922,164, Jul. 5, 1978, abandoned, which is a continuation of Ser. No. 795,684, May 11, 1977, abandoned.

[30] Foreign Application Priority Data

May 19, 1976 [CH] Switzerland ............... 6254/76

[51] Int. Cl.³ .............. C07C 103/38; C07C 103/78
[52] U.S. Cl. ...................... 564/158; 260/45.9 NC; 564/170
[58] Field of Search ........... 260/559 S, 558 R, 559 R, 260/559 D, 45.9 NC, 559 A

[56] References Cited

U.S. PATENT DOCUMENTS

| | | | |
|---|---|---|---|
| 3,584,047 | 6/1971 | Dexter et al. | 260/45.9 NC |
| 3,925,306 | 12/1975 | Schlicting et al. | 260/45.9 NC |
| 3,927,091 | 12/1975 | Emden et al. | 260/45.9 NC |
| 3,984,460 | 10/1976 | Spivack | 260/45.9 NC |
| 4,100,191 | 7/1978 | Fischer et al. | 260/553 A |

FOREIGN PATENT DOCUMENTS 965373  7/1964  United Kingdom .

Primary Examiner—V. P. Hoke
Attorney, Agent, or Firm—Wenderoth, Lind & Ponack

[57] ABSTRACT

A phenol of the formulae I, II or III

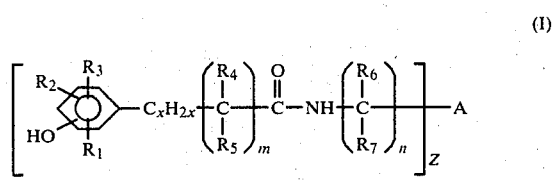

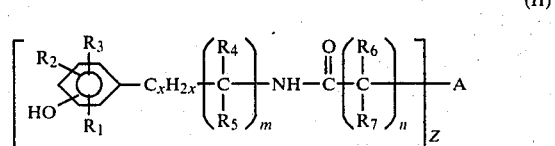

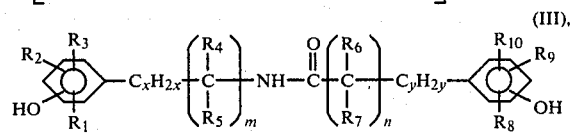

in which $R_1$, $R_2$ and $R_3$ are independent of one another and one of these is $C_1$–$C_{12}$-alkyl, $C_5$–$C_6$-cycloalkyl or $C_7$–$C_9$-aralkyl and the others are hydrogen, $C_1$–$C_{12}$-alkyl or $C_5$–$C_6$-cycloalkyl, $R_4$, $R_5$, $R_6$ and $R_7$ are independent of one another and one of these is $C_1$–$C_{12}$-alkyl or $C_5$–$C_6$-cycloalkyl and the others are hydrogen, $C_1$–$C_{12}$-alkyl or $C_5$–$C_6$-cycloalkyl, or $R_4$ and $R_5$, or $R_6$ and $R_7$, together with the C atom which links them, form a 5-12-membered ring, $R_8$, $R_9$ and $R_{10}$ are independent of one another and one of these is $C_1$–$C_{12}$-alkyl, $C_5$–$C_6$-cycloalkyl or $C_7$–$C_9$-aralkyl and the others are hydrogen, $C_1$–$C_{12}$-alkyl or $C_5$–$C_6$-cycloalkyl, x and y independently of one another are 0, 1, 2 or 3, one of m and n is 1 and the other is 0 or 1, A is a monovalent, divalent or trivalent hydrocarbon radical which, in formula II, can also be interrupted by S, and Z is 1, 2 or 3, corresponding to the valency of A, and, in compounds of the formula II and III, m is 1 and $R_4$ and $R_5$ independently of one another are $C_1$–$C_{12}$-alkyl or $C_5$–$C_6$-cycloalkyl and, in compounds of the formula I, $R_6$ can be bridged with A to form a carbocyclic structure as stabilizers for organic material.

4 Claims, No Drawings

HINDERED PHENOLIC AMIDES

This application is a continuation of application Ser. No. 922,164, filed July 5, 1978 (now abandoned), which application is in turn a continuation of application Ser. No. 795,684, filed May 11, 1977 (now abandoned).

The invention relates to new alkylphenols, their manufacture and their use for stabilising organic material against oxidative degradation, as well as to the organic materials stabilised with these alkylphenols.

Amides and amines which carry sterically hindered hydroxyphenyl groups are known for stabilising organic material. Thus, U.S. Pat. No. 3,584,047 describes benzamides and phenylalkanecarboxylic acid amides which carry a sterically hindered hydroxyl group in the phenyl nucleus as stabilisers for polyolefines, such as polyethylene, or polyamides, such as polyhexamethylene-adipamide. Furthermore, U.S. Pat. No. 3,923,735 describes N-phenylpropyl-alkanoylamides as antioxidants for polyamides, such as polyhexamethylene-adipamide. Furthermore, Belgian Pat. No. 811,014 describes N-phenylpropylalkanoylamides as antioxidants for polyamides.

These stabilisers known hitherto are, however, unable to impart adequate protection to a polymer for industrial purposes. In particular, they are inadequate in the long-term stabilisation of polyolefines against thermo-oxidative degradation and in respect of stability on the addition of the additive prior to the polycondensation reaction for the manufacture of polyamides and this manifests itself in a reduction in the effectiveness when the said mode of incorporation is employed.

The object of the invention was to avoid these disadvantages and the invention now provides stabilisers which, in polyolefines, and especially in polypropylene, effect outstanding long-term stabilisation coupled with excellent colour properties after ageing and also a stability to light which is improved compared with the state of the art, especially U.S. Pat. No. 3,584,047, and which display an excellent effectiveness in the stabilisation of polyamides, even when the additive is added prior to the polycondensation reaction. The long-term stabilisation manifests itself above all in the ageing test by a markedly large temperature gradient (see the Tables in Examples 23 and 24).

The invention relates to phenols of the formulae I, II and III

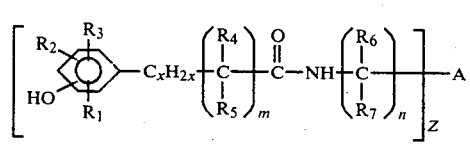 (I)

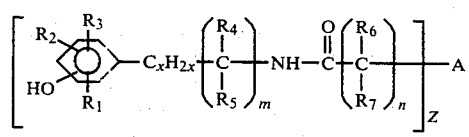 (II)

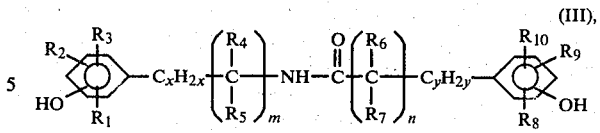 (III), in which $R_1$, $R_2$ and $R_3$ are independent of one another and one of these is $C_1$–$C_{12}$-alkyl, $C_5$–$C_6$-cycloalkyl or $C_7$–$C_9$-aralkyl and the others are hydrogen, $C_1$–$C_{12}$-alkyl or $C_5$–$C_6$-cycloalkyl, $R_4$, $R_5$, $R_6$ and $R_7$ are independent of one another and one of these is $C_1$–$C_{12}$-alkyl or $C_5$–$C_6$-cycloalkyl and the others are hydrogen, $C_1$–$C_{12}$-alkyl or $C_5$–$C_6$-cycloalkyl, or $R_4$ and $R_5$, or $R_6$ and $R_7$, together with the C atom which links them, form a 5–12-membered ring, $R_8$, $R_9$ and $R_{10}$ are independent of one another and one of these is $C_1$–$C_{12}$-alkyl, $C_5$–$C_6$-cycloalkyl or $C_7$–$C_9$-aralkyl and the others are hydrogen, $C_1$–$C_{12}$-alkyl or $C_5$–$C_6$-cycloalkyl, x and y independently of one another are 0, 1, 2 or 3, one of m and n is 1 and the other is 0 or 1, A is a monovalent, divalent or trivalent hydrocarbon radical which, in formula II, can also be interrupted by S, and Z is 1, 2 or 3, corresponding to the valency of A, and, in compounds of the formula II and III, m is 1 and $R_4$ and $R_5$ independently of one another are $C_1$–$C_{12}$-alkyl or $C_5$–$C_6$-cycloalkyl and, in compounds of the formula I, $R_6$ can be bridged with A to form a carbocyclic structure.

As $R_1$, $R_2$, $R_3$, $R_8$, $R_9$ and $R_{10}$, alkyl with 1–12 C atoms is straight-chain or, in particular, branched alkyl with, in particular, up to 8 C atoms, such as methyl, tert.-octyl and, above all, tert.-butyl.

As $R_1$, $R_2$, $R_3$, $R_4$, $R_5$, $R_6$, $R_7$, $R_8$, $R_9$ and $R_{10}$, cycloalkyl with 5–6 C atoms is, in particular, cyclopentyl or, above all, cyclohexyl.

As $R_4$, $R_5$, $R_6$ and $R_7$, alkyl with 1–12 C atoms is branched or, in particular, straight-chain alkyl with, in particular, 1–6 C atoms, above all methyl. In each case, the two radicals $R_4$ and $R_5$, or $R_6$ and $R_7$, are preferably $C_1$–$C_{12}$-alkyl, above all methyl.

If $R_4$ and $R_5$, or $R_6$ and $R_7$, together with the C atom which links them, form a 5–12-membered ring, they form, in particular, a 5-membered or 6-membered ring, above all cyclopentylidene or cyclohexylidene.

A monovalent, divalent or trivalent hydrocarbon radical is, in particular, such a radical containing 1–13 C atoms. As a monovalent radical, A is, for example, $C_1$–$C_{13}$-alkyl, especially $C_1$–$C_6$-alkyl, such as ethyl, n-propyl, n-butyl or, in particular, methyl, or $C_5$–$C_6$-cycloalkyl, such as cyclopentyl or cyclohexyl, or $C_7$–$C_{13}$-aralkyl, such as benzyl, or $C_6$–$C_{10}$-aryl, such as phenyl. As a divalent radical, A is, for example, $C_1$–$C_{13}$-alkylidene, especially $C_1$–$C_6$-alkylidene, such as ethylidene, n-propylidene or, in particular, methylene, or $C_2$–$C_{13}$-alkylene, especially $C_2$–$C_6$-alkylene, such as propylene or ethylene, or $C_5$–$C_6$-cycloalkylidene, such as cyclohexylidene, or $C_5$–$C_6$-cycloalkylene, such as cyclohexylene, or $C_6$–$C_{12}$-cycloalkyl-alkylidene, such as cyclohexylmethylene, or $C_7$–$C_{13}$-aralkylidene, such as benzylidene, or $C_6$–$C_{10}$-arylene, such as phenylene. As a trivalent radical, A is, for example, $C_1$–$C_{13}$-alkylidine, especially $C_1$–$C_6$-alkylidine, such as ethylidine, propylidine or, in particular, methylidine. A interrupted by S is, in particular, alkyl or alkylene which are interrupted by S, alkyl and alkylene having, in particular, the above meaning.

If, in compounds of the formula I, $R_6$ is linked to A and forms, together with the C atom which links them, a carbocyclic structure, $R_6$ and A together are, in particular, $C_4$–$C_{12}$-alkylene with 4 or 5 chain C atoms, such as tetramethylene or pentamethylene.

Compounds of the formulae Ia, IIa and IIIa

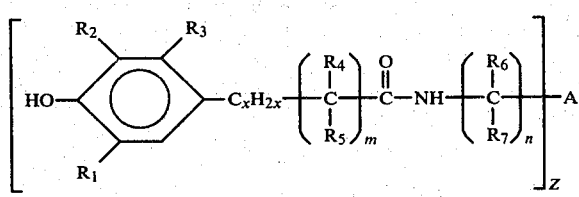

(Ia)

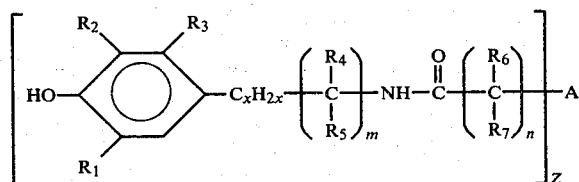

(IIa)

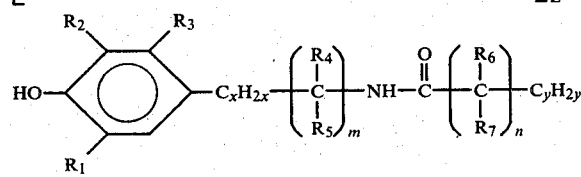

(IIIa), in which the symbols have the above meaning, are preferred.

Preferably, in these compounds, $R_1$ and $R_8$ are $C_1$–$C_6$-alkyl, $R_2$ and $R_9$ are hydrogen or $C_1$–$C_6$-alkyl, $R_3$ and $R_{10}$ are hydrogen or $C_1$–$C_6$-alkyl, $R_4$, $R_5$, $R_6$ and $R_7$ are hydrogen or methyl and at least one of these is methyl, x and y are 1 or 2, one of m and n is 1 and the other is 0 or 1, A is $C_1$–$C_8$-alkyl or $C_2$–$C_8$-alkylthioalkyl when $Z=1$ and is $C_1$–$C_8$-alkylidene, $C_2$–$C_8$-alkylene, $C_2$–$C_8$-alkylenethioalkylene or $C_6$–$C_{10}$-arylene when $Z=2$ and Z is 1 or 2 and, in compounds of the formula IIa and IIIa, m is 1 and $R_4$ and $R_5$ are methyl.

Particularly preferentially, in compounds of the formulae Ia, IIa and IIIa, $R_1$, $R_2$, $R_8$ and $R_9$ are methyl, tert.-butyl or tert.-octyl, $R_3$ and $R_{10}$ are hydrogen, $R_4$, $R_5$, $R_6$ and $R_7$ are hydrogen or methyl and at least one of these is methyl, x and y are 1 or 2, one of m and n is 1 and the other is 0 or 1, A is $C_1$–$C_8$-alkyl or $C_2$–$C_8$-alkylthioalkyl when $Z=1$ and is $C_1$–$C_8$-alkylidene, $C_2$–$C_8$-alkylene, $C_2$–$C_8$-alkylene, $C_2$–$C_8$-alkylenethioalkylene or phenylene when $Z=2$ and Z is 1 or 2, and, in compounds of the formule IIa and IIIa, m is 1 and $R_4$ and $R_5$ are methyl. In particular, $R_4$, $R_5$, $R_6$ and $R_7$ are methyl.

Compounds of the formulae Ia, IIa and IIIa in which $R_1$, $R_2$, $R_8$ and $R_9$ are methyl, tert.-octyl or, in particular, tert.-butyl, $R_4$, $R_5$ and $R_6$ are methyl, $R_7$ is hydrogen or methyl, x and y are 1 or 2, one of m and n is 1 and the other is 0 or 1, A is $C_1$–$C_4$-alkylthioalkyl when $Z=1$ and is $C_1$–$C_4$-alkylidene, $C_2$–$C_4$-alkylene, $C_2$–$C_4$-alkylenethioalkylene or phenylene when $Z=2$ and Z is 1 or 2, and, in compounds of the formula IIa and IIIa, m is 1, are suitable above all. $R_4$, $R_5$, $R_6$ and $R_7$ are, above all, methyl.

The compounds mentioned in the examples may be singled out in particular.

The alkylphenols of the formulae I, II and III can be obtained according to synthesis processes which are in themselves known, for example by reacting an acid, or a derivative thereof, of the formulae IV, V or VI (IV)

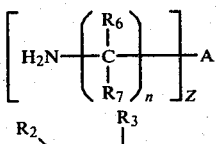

(V)

(VI),

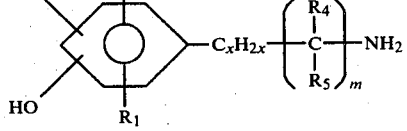

with an amine of the formulae VII or VIII (VII), (VIII)

Preferably, approximately equimolar amounts are used and the reaction is carried out in the presence of equimolar amounts of a base, such as a tertiary organic amine, an alkali metal hydroxide, an alkali metal carbonate or an alkali metal bicarbonate, and in an inert solvent, such as a hydrocarbon or an ether, ester or amide, such as dimethylacetamide or dimethylformamide. I is obtained from IV and VII, II is obtained from VIII and V and III is obtained from VIII and VI. A derivative of an acid is, in particular, a halide or an ester.

If a free acid is used together with an amine, the reaction is in particular carried out in the presence of an inorganic acid chloride, such as SOCl₂, PCl₃ or POCl₃.

If an ester is used together with an amine, the reaction is in particular carried out in the presence of an alkaline catalyst, such as lithium amide or an alkali metal alcoholate, such as sodium methylate.

The starting materials are known or, if they are new, can be manufactured analogously to the known materials in a manner which is in itself known.

Examples of plastics which can be stabilised with the new compounds are listed on pages 12-14 of German Offenlegungsschrift 2,456,864.

The stabilisation of polyolefines and styrene polymers and of polyamides is particularly important and the compounds of the formula I are oustandingly suitable for this. Examples of such polymers are high density polyethylene and low density polyethylene, polypropylene, ethylene/propylene copolymers, polystrene, styrene/butadiene/acrylonitrile copolymers, mixtures of polyolefines or of styrene polymers, and also polyamides.

The stabilisers are added to the plastics in a concentration of 0.01 to 5% by weight, calculated relative to the material to be stabilised. Preferably, 0.03 to 1.5, and particularly preferentially 0.2 to 0.6, % by weight of the compounds, calculated relative to the material to be stabilised, are incorporated into the latter.

Incorporation can be effected after polymerisation, for example by mixing the compounds, and optionally further additives, into the melt by the methods customary in the art, before or during shaping, or also by applying the dissolved or dispersed compounds to the polymer, with subsequent evaporation of the solvent if necessary.

The new compounds can also be added to the plastics to be stabilised in the form of a master batch which contains these compounds, for example in a concentration of 2.5 to 25% by weight.

In the case of crosslinked polyethylene, the compounds are added prior to crosslinking.

The invention therefore also relates to plastics which are stabilised by the addition of 0.01 to 5% by weight of a compound of the formula I and which optionally can contain yet further known and customary additives. The plastics stabilised in this way can be used in very diverse forms, for example as films, fibres, tapes or profiles or as binders for lacquers, adhesives or putties.

Examples which may be mentioned of further additives, together with which the stabilisers which can be used according to the invention can be employed, are: antioxidants, such as simple 2,6-dialkylphenols, derivatives of alkylated hydroquinones, hydroxylated thiodiphenyl ethers, alkylidene-bis-phenols, O-, N- and S-benzyl compounds, hydroxybenzylated malonates, hydroxybenzyl-aromatic compounds, s-triazine compounds, amides of β-(3,5-di-tert.-butyl-4-hydroxyphenyl)-propionic acid, esters of β-(3,5-di-tert.-butyl-4-hydroxyphenyl)-propionic acid, esters of β-(5-tert.-butyl-4-hydroxy-3-methylphenyl)-propionic acid, esters of 3,5-di-tert.-butyl-4-hydroxyphenylacetic acid, acylaminophenols, benzyl phosphonates and aminoaryl derivatives, UV absorbers and light stabilisers, such as 2-(2'-hydroxyphenyl)-benztriazoles, 2,4-bis-(2'-hydroxyphenyl)-6-alkyl-s-triazines, 2-hydroxybenzophenones, 1,3-bis-(2'-hydroxybenzoyl)-benzenes, esters of optionally substituted benzoic acids and acrylates, and also nickel compounds, sterically hindered amines, oxalic acid diamides, metal deactivators, phosphites, compounds which destroy peroxide, polyamide stabilisers, basic co-stabilisers, PVC stabilisers, nucleating agents or other additives, such as, for example, plasticisers, lubricants, emulsifiers, fillers, carbon black, asbestos, kaolin, talc, glass fibres, pigments, optical brighteners, flameproofing agents and antistatic agents.

Examples of further additives, together with which the stabilisers which can be used according to the invention can be employed are given on pages 18-24 of German Offenlegungsschrift 2,427,853.

In the case of polyamides, the additive can advantageously be employed with the monomers and adjuvants at the start of the polycondensation reaction.

The examples which follow illustrate the invention without restricting it.

EXAMPLE 1

35 g of 3-(4-hydroxy-3,5-di-t-butylphenyl)-2,2-dimethyl-propionyl chloride are dissolved in 80 ml of toluene and the solution is added dropwise to a solution of 5.8 g of hexamethylene-1,6-diamine and 11 g of triethylamine in 80 ml of toluene, at 20°-40° C., whilst stirring. After stirring for 3 hours at 40° C., the triethylamine hydrochloride formed is filtered off and some of the solvent from the filtrate is evaporated off under reduced pressure. The N,N'-di-[3-(4-hydroxy-3,5-di-t-butylphenyl)-2,2-dimethyl-propionyl]-hexamethylene-1,6-diamine which has crystallised out is isolated and dried in vacuo at 80°.

The product is a white crystalline powder with a melting point of 172° C. (stabiliser No. 1).

EXAMPLE 2

35 g of the acid chloride from Example 1 are dissolved in 80 ml of dioxane and this solution is added dropwise to a solution of 7.2 g of 2,5-dimethyl-2,5-diaminohexane and 11 g of triethylamine in 80 ml of N,N-dimethylacetamide, at 20°-40° C., whilst stirring, and the mixture is stirred at 20°-30° C. for 6 hours.

200 ml of water are then added to the batch and the semi-crystalline reaction product is separated off from the mother liquor and dissolved in methanol.

On concentrating the solvent under reduced pressure, the pure amide crystallises out. It is isolated and dried at 80° C. This gives N,N'-di-[3-(4-hydroxy-3,5-di-t-butylphenyl)-2,2-dimethylpropionyl]-2,5-dimethyl-2,5-diaminohexane in the form of a white crystalline powder with a melting point of 160° C. (stabiliser 2).

EXAMPLE 3

If, in Example 2, the amine is replaced by 2,11-dimethyl-2,11-diamino-dodecane, an identical procedure gives N,N'-di-[3-(4-hydroxy-3,5-di-t-butylphenyl)-2,2-dimethylpropionyl]-2,11-dimethyl-2,11-diamino-dodecane with a melting point of 126° C. (stabiliser 3).

EXAMPLE 4

If, in Example 2, the amine is replaced by 2,4,4-trimethyl-2-aminopentane, this gives N-[3-(4-hydroxy-3,5-di-t-butylphenyl)-2,2-dimethylpropionyl]-2,4,4-trimethyl-2-aminopentane with a melting point of 126° C. (stabiliser 4).

EXAMPLE 5

29.7 g of 4-hydroxy-3,5-di-t-butyl-phenylpropionyl chloride are dissolved in 50 ml of dioxane and this solution is added dropwise to a solution of 11.4 g of 2,11-diamino-2,11-dimethyl-dodecane in 50 ml of dimethylacetamide, at 20°–40° C., whilst stirring, and the mixture is stirred at 30° C. for 6 hours. 200 ml of water are then added to the batch and the crystalline precipitate is filtered off. After recrystallisation from methanol, this gives N,N'-di-(4-hydroxy-3,5-di-t-butylphenylpropionyl)-2,11-dimethyl-2,11-diaminododecane in the form of a white crystalline powder with a melting point of 135° C. (stabiliser 5).

EXAMPLES 6–11

If, in Example 5, the amine is replaced by one of the amines from the table which follows, an identical procedure gives the corresponding amides with the indicated melting points.

EXAMPLE 12

31.4 g of 2-(4-hydroxy-3,5-di-t-butylphenyl)-1,1-dimethyl-ethylamine, together with 11 g of triethylamine, are dissolved in 100 ml of N,N-dimethylacetamide and a solution of 30.3 g of stearyl chloride in 50 ml of dioxane is added slowly at 20°–40° C., whilst stirring. The batch is stirred at 30° C. for about 6 hours, 200 ml of water are then added and the amide which has precipitated is isolated, dried and recrystallised from acetonitrile. This gives N-stearoyl-2-(4-hydroxy-3,5-di-t-butylphenyl)-1,1-dimethyl-ethylamine in the form of a white crystalline powder with a melting point of 74° C. (stabiliser 12).

EXAMPLE 13–17

If, in Example 12, the stearoyl chloride is replaced by one of the acid chlorides from the table which follows, an otherwise identical procedure gives the following monoamides and diamides with the indicated melting points:

| Example Stabiliser No. | Starting amine | Amide | Amide melting point °C. |
|---|---|---|---|
| 6 | (H$_2$N—C(CH$_3$)$_2$—CH$_2$—)$_2$ | (HO—Ar—CH$_2$CH$_2$—C(O)—NH—)C(CH$_3$)$_2$—(CH$_2$)$_2$— | 248° C. |
| 7 | (H$_2$N—CH(Ph)—CH$_2$CH$_2$CH$_2$CH$_2$—)$_2$ | [HO—Ar—CH$_2$CH$_2$—C(O)—NH—CH(Ph)—(CH$_2$)$_4$—]$_2$ | 198° C. |
| 8 | (H$_2$N—CH(CH$_3$)—CH$_2$CH$_2$CH$_2$CH$_2$—)$_2$ | [HO—Ar—CH$_2$CH$_2$—C(O)—NH—CH(CH$_3$)—(CH$_2$)$_4$—]$_2$ | 78° C. |
| 9 | cyclohexane with CH$_3$, NH$_2$, CH$_3$—C—CH$_3$, NH$_2$ substituents | HO—Ar—CH$_2$CH$_2$—C(O)—NH—cyclohexyl—NH—C(O)—CH$_2$CH$_2$—Ar—OH | 154° C. |
| 10 | cyclohexane with CH$_3$, NH$_2$, CH$_3$, CH$_3$, CH$_2$NH$_2$ substituents | HO—Ar—CH$_2$CH$_2$—C(O)—NH—cyclohexyl—NH—C(O)—CH$_2$CH$_2$—Ar—OH | 130° C. |
| 11 | HO—Ar—C(CH$_3$)$_2$—NH$_2$ | HO—Ar—CH$_2$CH$_2$—C(O)—NH—C(CH$_3$)$_2$—Ar—OH | 186° C. |

| Example Stabiliser No. | Starting carboxylic acids | Amide | Melting point (°C.) |
|---|---|---|---|
| 13 | ClC(O)—(CH₂)₄—C(O)Cl | [HO—(3,5-di-X-phenyl)—CH₂—NH—C(O)—(CH₂)₂—]₂ | 240° C. |
| 14 | ClC(O)—(CH₂)₈—C(O)Cl | [HO—(3,5-di-X-phenyl)—CH₂—NH—C(O)—(CH₂)₄—]₂ | 188° C. |
| 15 | ClC(O)—C(CH₃)₂—CH₂—(3,5-di-X-phenyl)—OH | HO—(3,5-di-X-phenyl)—CH₂—NH—C(O)—C(CH₃)₂—CH₂—(3,5-di-X-phenyl)—OH | 178° C. |
| 16 | Cl—C(O)—CH₂CH₂—(3,5-di-X-phenyl)—OH | HO—(3,5-di-X-phenyl)—CH₂—NH—C(O)—CH₂CH₂—(3,5-di-X-phenyl)—OH | 176° C. |
| 17 | ClC(O)—(3,5-di-X-phenyl)—OH | HO—(3,5-di-X-phenyl)—CH₂—NH—C(O)—(3,5-di-X-phenyl)—OH | 244° C. |
| 18 | ClC(O)—(phenyl)—C(O)Cl | HO—(3,5-di-X-phenyl)—CH₂—NH—C(O)—(phenyl)—C(O)—NH—CH₂—(3,5-di-X-phenyl)—OH | 265° C. |
| 19 | ClC(O)—CH₂CH₂—S—CH₂CH₂—C(O)Cl | {HO—(3,5-di-X-phenyl)—CH₂—NH—C(O)—(CH₂)₂—}₂S | 167° C. |

EXAMPLE 20

28.3 g of 4-hydroxy-3,5-di-t-butylphenyl-acetyl chloride are dissolved in 60 ml of dioxane and this solution is added dropwise to a solution of 7.2 g of 2,5-dimethyl-2,5-diamino-hexane and 11 g of triethylamine in 80 ml of N,N-dimethylacetamide, at 20°–40° C., whilst stirring, and the mixture is stirred for 6 hours at 20°–30° C. The isolation and purification of the amide are carried out as in Example 13.

The resulting N,N'-di-(4-hydroxy-3,5-di-t-butyl-phenyl-acetyl)-2,5-dimethyl-2,5-diamino-hexane is a white crystalline powder with a melting point of 216° C. (stabiliser 20).

EXAMPLE 21

If, in Example 20, the amine is replaced by 2,11-dimethyl-2,11-diamino-dodecane, the same procedure gives N,N'-di-(4-hydroxy-3,5-di-t-butylphenyl-acetyl)-2,11-dimethyl-2,11-diamino-dodecane with a melting point of 168° C. (stabiliser 21).

EXAMPLE 22

Copolymerisation of the Additives in PA 6

A polyamide 6 is manufactured in the customary manner from caprolactam with the addition of 3% of water, 0.12% of n-butyl-ammonium acetate, 0.2% of "Tipure LW" titanium dioxide, 10 ppm of manganese-II oxalate and 0.5% of one of the additives from the table which follows.

The resulting polymer is extruded, granulated, extracted three times with boiling water for two hours in order to remove the oligomers and dried at 110° C. for 14 hours under a high vacuum. The polyamide 6 is then spun to filaments with a titre of 190/17 (denier) (spinning temperature: 220°/250°/265° C., stretching about 1:4.5).

Small fibre hanks prepared therefrom are now stored in a circulating air oven at 177°±2° C. The degradation of the polymer is ascertained by determining the tensile strength. In the table, R in each case denotes the residual tensile strength after 8 and 16 hours as % of the tensile strength at the start of the heating test.

| Formulation | R in % after 8 hours | R in % after 16 hours |
|---|---|---|
| without additive | 41 | 34 |
| 0.5% of stabiliser 6 | 87 | 78 |
| 0.5% of stabiliser 1 | 94 | 81 |
| 0.5% of 1,6-bis-[3-(3,5-di-t-butyl-4-hydroxyphenyl)-propionamido]-hexane (Example 1, U.S. Patent Specification 3,584,047) | 75 | 51 |

EXAMPLE 23

Addition of the additive to ready prepared PA 6

The additives listed in the table which follows are coated, as the dry material, in a concentration of 0.5% onto dried polyamide 6 granules and the coating mixtures are melted at 260° C. to give a regulus.

Samples are taken from the cooled reguli and converted, at 260° C., into 0.3 mm thick pressed sheets and 1 cm broad test strips are punched out from these sheets.

The test to determine the effectiveness of the additives added to the test pieces is carried out by means of heat ageing in a circulating air oven at 165° C. The thermooxidative degradation of the material during heat ageing is followed by periodic measurement of the relative viscosity of a 1% strength solution in concentrated sulphuric acid and the time in hours after which the relative viscosity has fallen by one third of the initial value is determined.

The initial colour of the reguli prior to ageing in the oven is flawless according to visual assessment, that is to say is not adversely affected by the additive.

| Stabiliser | Hours at 165° C. |
|---|---|
| without additive | 15 |
| 1 | 67 |
| 2 | 40 |
| 6 | 70 |
| 11 | 44 |
| Example 1, U.S. Patent Specification 3,584,047 | 72 |

EXAMPLE 24

100 parts of polypropylene (melt index 2.6 g/10 minutes, 230° C./2,160 g) are kneaded with 0.2 part of one of the additives listed in the table which follows for 10 minutes in a Brabender plastograph at 200° C. The composition which is thus obtained is then pressed in a platen press for 6 minutes at a plate temperature of 260° C. to give 1 mm thick sheets, from which strips 1 cm broad and 17 cm long are punched.

The test to determine the effectiveness of the additives added to the test strips is carried out by heat ageing in a circulating air oven at 135° and 149° and an additive-free test strip is used for comparison. 3 test strips from each formulation are employed for this test. The end point is defined as the incipient decomposition of the test strip, which is easily recognisable by complete embrittlement. The results are given in days.

| Stabiliser | Days until the start of decomposition at | |
|---|---|---|
| | 135° C. | 149° C. |
| without additive | 1 | <1 |
| 1 | 101 | 22 |
| 2 | 64 | 8 |
| 5 | 168 | 60 |
| 6 | 123 | 56 |
| 11 | 12 | 3 |
| 12 | 75 | 11 |
| 16 | 58 | 13 |
| 17 | | 11 |
| 20 | 114 | 23 |
| 21 | 132 | 37 |
| Example 1, U.S. Patent Specification 3,584,047 | 113 | 37-47-57 |

EXAMPLE 25

100 parts of polypropylene (melt index 2.6 g/10 minutes, 230° C./2,160 g) are homogenised, as in Example 22, with 0.1 part of one of the additives listed in the table which follows and 0.3 part of dilauryl thiodipropionate. A test strip which contains only 0.3 part of dilauryl thiodipropionate is used for comparison.

| Stabiliser | Days until the start of decomposition | |
|---|---|---|
| | 135° C. | 149° C. |
| without additive | 19 | 4 |
| 1 | 105 | 29 |
| 2 | 95 | 25 |
| 5 | 167 | 55 |
| 6 | 130 | 62 |
| 11 | 41 | 9 |
| 12 | 76 | 18 |
| 16 | 59 | 14 |
| 17 | | 29 |
| 20 | 73 | 19 |
| 21 | 125 | 34 |
| Example 1, U.S. Patent Specification 3,584,047 | 118 | 41-48-63 |

EXAMPLE 26

In addition, the colour stability of the test pieces described in Example 23 is tested and this test is carried out:

(a) after incorporation (column 2), (b) after exposure in a Xenotest apparatus from Messrs. Hanau for 500 hours (column 3) and (c) after treatment with boiling water for 1 week (column 4).

An empirical colour scale in which 5 denotes no coloration, 4 denotes a slight discoloration which is just detectable and 3, 2, 1 and <1 denote successively more pronounced discolorations is used for the assessment.

| Stabiliser | Assessment of the colour according to scale 1–5 | | |
|---|---|---|---|
| | after incorporation | after exposure | boiling water 1 week |
| without additive | 5 | 5 | 4–5 |
| 1 | 4–5 | 5 | 4–5 |
| 2 | 4–5 | 5 | 4–5 |
| 5 | 4–5 | 5 | 4 |
| 6 | 4–5 | 5 | 4–5 |
| 11 | 4–5 | 4–5 | 4 |
| 13 | 4–5 | 5 | 4–5 |
| 17 | 4–5 | 5 | 4 |
| 20 | 4–5 | 5 | 4–5 |
| 21 | 4–5 | 5 | 4–5 |
| 22 | 4 | 5 | 4 |
| Example 1, U.S. Pat. Specification 3,584,047 | 2–3 / 4–5 | 5 | 1–2 / 4–5 |

EXAMPLE 27

Assessment of the Resistance to "Gas Fading"

A piece of cotton fabric is saturated with a 1% strength solution of one of the additives of the table which follows and then dried. The piece of fabric treated in this way is exposed to the off-gases from a number of natural gas burners for one hour at a temperature of 100° in a closed chamber. The piece of fabric is then extracted with a mixture of 100 ml of dimethylacetamide and 1 ml of piperidine. The intensity of the coloration (usually yellow) of the resulting solution is taken as a measure of the resistance to gas fading of the additive examined.

An empirical colour scale in which 5 denotes no coloration, that is to say very good resistance to gas fading, 4 denotes a slight discoloration which is just detectable and 3, 2, and 1 denote a successively more pronounced discoloration was used for the table.

| Stabiliser | Assessment of the colour according to scale 1–5 after gas fading |
|---|---|
| 1 | 4–5 |
| 2 | 5 |
| 5 | 4–5 |
| 6 | 4 |
| 11 | 4–5 |
| 13 | 4–5 |
| 17 | 3–4 |
| 20 | 4 |
| 21 | 4–5 |
| 22 | 4–5 |
| Example, U.S. Patent Specification 3,584,047 | 4–5 |

EXAMPLE 28

Test to determine the stability to light in polypropylene 100 parts of polypropylene powder (Moplen, fibre grade, from Messrs. Montedison) are homogenised with 0.2 part of one of the stabilisers from the table which follows for 10 minutes in a Brabender plastograph at 200° C. The composition thus obtained is removed from the kneader as rapidly as possible and pressed in a toggle press to give a 2–3 mm thick sheet. Part of the resulting pressed blank is cut out and pressed between two high-gloss hard aluminium foils for 6 minutes at 260° and under a pressure of 12 tonnes, using a manual hydraulic laboratory press, to give a 0.5 mm thick film, which is immediately plunged into cold water. The 0.1 mm thick test film is produced from this 0.5 mm film under precisely the same conditions. Cut pieces, each measuring 60×44 mm are now punched from this test film and exposed in a Xenotest 150. These test are removed from the exposure apparatus at regular intervals and their carbonyl content is tested in a IR spectrophotometer. The increase in the carbonyl extinction at 5.85μ on exposure is a measure of the photo-oxidative degradation of the polymers (see L. Balaban et al., J. Polymer Sci. Part C, 22, 1059–1071 (1969); J. F. Heacock, J. Polymer Sci. Part A-1, 22, 2921–34 (1969) and D. J. Carlsson and D. M. Wiles, Macromolecules 2, 587–606 (1969)) and, according to experience, is associated with a deterioration of the mechanical properties of the polymer.

The protective action of the stabilisers according to the invention can be seen from the table which follows:

TABLE

| Stabiliser No. | Exposure time in hours until the CO extinction = 0.3 |
|---|---|
| Comparison Irganox 1098 | 340 |
| 5 | 410 |
| 6 | 430 |
| 12 | 640 |
| 13 | 580 |
| 14 | 620 |
| 16 | 750 |
| 17 | 1,360 |

What is claimed is:

1. A phenol of the formulae I, II or III

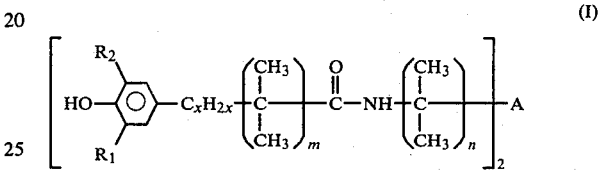

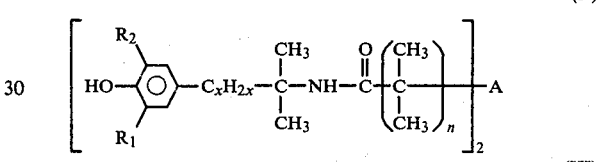

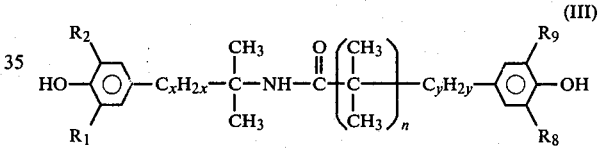

wherein $R_1$, $R_2$, $R_8$ and $R_9$, independently of one another, are methyl or tert.-butyl, x and y, independently of one another, are 1 or 2, one of m and n is 1 and the other is 0 or 1 and A is $C_2$–$C_8$ alkylene.

2. A phenol according to claim 1, wherein $R_1$, $R_2$, $R_8$ and $R_9$, independently of one another, are methyl or tert.-butyl, x and y, independently of one another, are 1 or 2, one of m and n is 1 and the other is 0 or 1 and A is $C_2$–$C_4$ alkylene.

3. A phenol according to claim 1, said phenol being N,N'-di[3-(4-hydroxy-3,5-di-t-butylphenyl)-2,2-dimethyl-propionyl]-hexamethylene-1,6-diamine.

4. A phenol according to claim 1, said phenol being N,N'-di-(4-hydroxy-3,5-di-t-butylphenylpropionyl)-2,11-dimethyl-2,11-diaminododecane.

* * * * *